(12) United States Patent
Zhang et al.

(10) Patent No.: US 12,017,175 B2
(45) Date of Patent: Jun. 25, 2024

(54) PLEATED AIR FILTER WITH BRIDGING FILAMENTS AND CONTINUOUS-CONTACT FILAMENTS

(71) Applicant: 3M INNOVATIVE PROPERTIES COMPANY, St. Paul, MN (US)

(72) Inventors: Zhiqun Zhang, North Oaks, MN (US); Nhat Ha Thi Nguyen, Woodbury, MN (US); Jimmy M. Le, St. Paul, MN (US); Glen O. Gregerson, Hudson, WI (US); Bryan L. Gerhardt, Woodbury, MN (US); Philip D. Eitzman, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 619 days.

(21) Appl. No.: 17/263,834

(22) PCT Filed: Jul. 30, 2019

(86) PCT No.: PCT/IB2019/056507
§ 371 (c)(1),
(2) Date: Jan. 27, 2021

(87) PCT Pub. No.: WO2020/026149
PCT Pub. Date: Feb. 6, 2020

(65) Prior Publication Data
US 2021/0229022 A1    Jul. 29, 2021

Related U.S. Application Data

(60) Provisional application No. 62/714,178, filed on Aug. 3, 2018.

(51) Int. Cl.
*B01D 46/52* (2006.01)
*B01D 39/16* (2006.01)
(Continued)

(52) U.S. Cl.
CPC ......... *B01D 46/523* (2013.01); *B01D 39/163* (2013.01); *B01D 46/0001* (2013.01);
(Continued)

(58) Field of Classification Search
None
See application file for complete search history.

(56) References Cited

U.S. PATENT DOCUMENTS

RE30,782 E    10/1981  Van
4,813,948 A    3/1989  Insley
(Continued)

FOREIGN PATENT DOCUMENTS

CN    206184173    5/2017
EP    1034024    4/2002
(Continued)

OTHER PUBLICATIONS

International Search Report for PCT International Application No. PCT/IB2019/056507, dated Jan. 13, 2020, 4 pages.

*Primary Examiner* — Jason M Greene
(74) *Attorney, Agent, or Firm* — Kenneth B. Wood (57) ABSTRACT

A pleated air filter media is provided. The pleated air filter media comprises a plurality of upstream linear bridging filaments that are extrusion-bonded to at least some of a plurality of upstream pleat tips of a fibrous web, and a plurality of downstream continuous-contact filaments that are extrusion-bonded to a downstream face of the fibrous web. Methods of making and using the same are also provided.

20 Claims, 5 Drawing Sheets

(51) Int. Cl.
    *B01D 46/00*         (2022.01)
    *B31D 5/00*         (2017.01)

(52) U.S. Cl.
    CPC ..... *B01D 46/0005* (2013.01); *B01D 46/0032* (2013.01); *B31D 5/0082* (2013.01); *B01D 2239/0435* (2013.01); *B01D 2239/0618* (2013.01); *B01D 2239/0627* (2013.01); *B01D 2239/10* (2013.01); *B01D 2265/04* (2013.01); *B01D 2265/06* (2013.01); *B01D 2275/50* (2013.01)

(56) References Cited

U.S. PATENT DOCUMENTS

| | | | |
|---|---|---|---|
| 4,976,677 | A | 12/1990 | Siversson |
| 5,035,240 | A | 7/1991 | Braun |
| 5,230,800 | A | 7/1993 | Nelson |
| 5,256,231 | A | 10/1993 | Gorman |
| 5,389,175 | A | 2/1995 | Wenz |
| 5,662,728 | A | 9/1997 | Groeger |
| 5,753,343 | A | 5/1998 | Braun |
| 6,365,088 | B1 | 4/2002 | Knight |
| 6,740,137 | B2 | 5/2004 | Kubokawa |
| 6,858,297 | B1 | 2/2005 | Shah |
| 7,235,115 | B2 | 6/2007 | Duffy |
| 7,858,163 | B2 | 12/2010 | Angadjivand |
| 7,959,699 | B2 | 6/2011 | Privitt |
| 8,162,153 | B2 | 4/2012 | Fox |
| 8,231,700 | B2 | 7/2012 | Sundet |
| 8,240,484 | B2 | 8/2012 | Fox |
| 8,419,817 | B2 | 4/2013 | Sundet et al. |
| 8,685,129 | B2 | 4/2014 | Lise |
| 8,834,611 | B1 | 9/2014 | Dimicelli |
| 9,174,159 | B2 | 11/2015 | Sanocki |
| 9,278,301 | B2 | 3/2016 | Fox |
| 9,808,753 | B2 | 11/2017 | Lise |
| 9,976,771 | B2 | 5/2018 | Chen |
| 2004/0011204 | A1 | 1/2004 | Both |
| 2007/0180803 | A1 | 8/2007 | Sundet et al. |
| 2008/0038976 | A1 | 2/2008 | Berrigan |
| 2010/0326028 | A1* | 12/2010 | Sundet ............... B01D 39/1623 55/499 |
| 2011/0000845 | A1* | 1/2011 | Fox ..................... B01D 39/163 428/176 |
| 2011/0114555 | A1 | 5/2011 | Coulson et al. |
| 2012/0017910 | A1 | 1/2012 | Li |
| 2013/0101477 | A1 | 4/2013 | Both |
| 2015/0047507 | A1* | 2/2015 | Fox .................... B01D 46/0001 156/60 |
| 2016/0288025 | A1 | 10/2016 | Whitlock |
| 2017/0000113 | A1 | 1/2017 | Grad et al. |
| 2017/0252590 | A1 | 9/2017 | Angadjivand |
| 2018/0021716 | A1 | 1/2018 | Li |
| 2018/0056226 | A1 | 3/2018 | Buettner, III et al. |

FOREIGN PATENT DOCUMENTS

| | | |
|---|---|---|
| WO | WO 2017-213926 | 12/2017 |
| WO | 2020026152 A1 | 2/2020 |
| WO | WC 2020-026152 | 2/2020 |
| WO | WO 2020-024245 | 2/2020 |
| WO | WO 2020-026062 | 2/2020 |

* cited by examiner

PLEATED AIR FILTER WITH BRIDGING FILAMENTS AND CONTINUOUS-CONTACT FILAMENTS

BACKGROUND

Pleated filters are commonly used in air filtration applications, e.g. in heating-ventilating-air conditioning (HVAC) systems, room air purifiers, and so on.

SUMMARY

Herein is disclosed a pleated air filter media with linear bridging filaments and with continuous-contact filaments. Also disclosed are methods of making and using such pleated air filter media. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Definitions

Although terms such as "top", bottom", "upper", "lower", "under", "over", "front", "back", "up" and "down", and "first" and "second" may be used in this disclosure, it should be understood that those terms are used in their relative sense only unless otherwise noted. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match. The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter.

The term "upstream" is used to denote the side of the air filter from which moving air (e.g. in an HVAC system) impinges on the filter media. The term "downstream" is used to denote the side of an air filter through which air exits the filter media. Pleated filters are often marked (or otherwise designated) by the manufacturer to identify upstream and downstream sides in order that the filter be installed in the proper orientation in an HVAC system; thus, the terms upstream and downstream can serve to differentiate the two sides of a pleated filter even if the filter has not yet been positioned in an HVAC system. Various Figures are marked with "u" and "d" arrows to aid in recognition of upstream and downstream directions.

By a "bridging filament" is meant a filament that extends between, and is extrusion-bonded to, at least two pleat tips that are on the same major face of a pleated media.

By a "linear" bridging filament is meant a bridging filament that, when viewed along the Pleat Direction of a pleated media, follows an at least substantially linear path between successive pleat tips that are on the same major face of a pleated media, and that does not follow the pleat walls or droop significantly into the pleat valleys.

By a "continuous-contact" filament is meant a filament that is in continuous contact with, and extrusion-bonded to, a major face of a pleated media and that thus follows the pleat walls of that face of the pleated media.

By "extrusion-bonded" is meant a filament that is bonded to at least some of the fibers of a pleated media by being extruded as a molten stream of material that is contacted with the pleated medias, cooled, and solidified, in order to bond to the pleated media tips.

DETAILED DESCRIPTION

Figure 1:
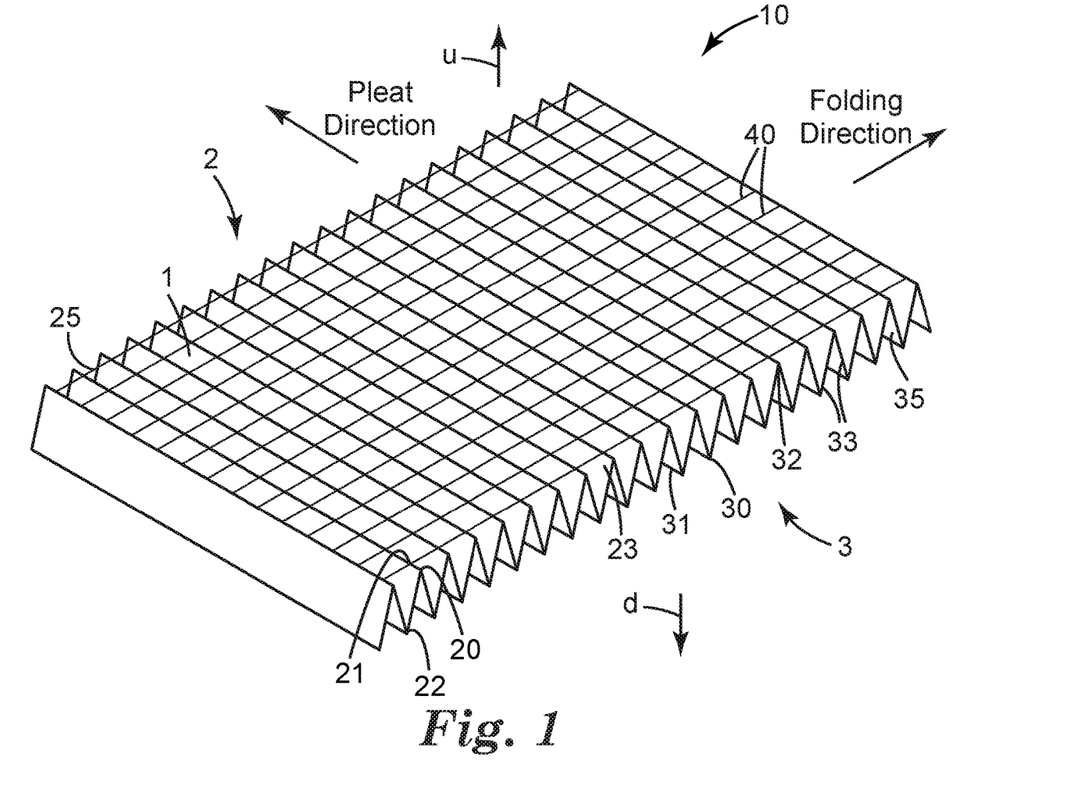
FIG. 1 is a perspective view from the upstream side of an exemplary pleated air filter media, depicting linear bridging filaments on an upstream face of the pleated air filter media.
Figure 2:
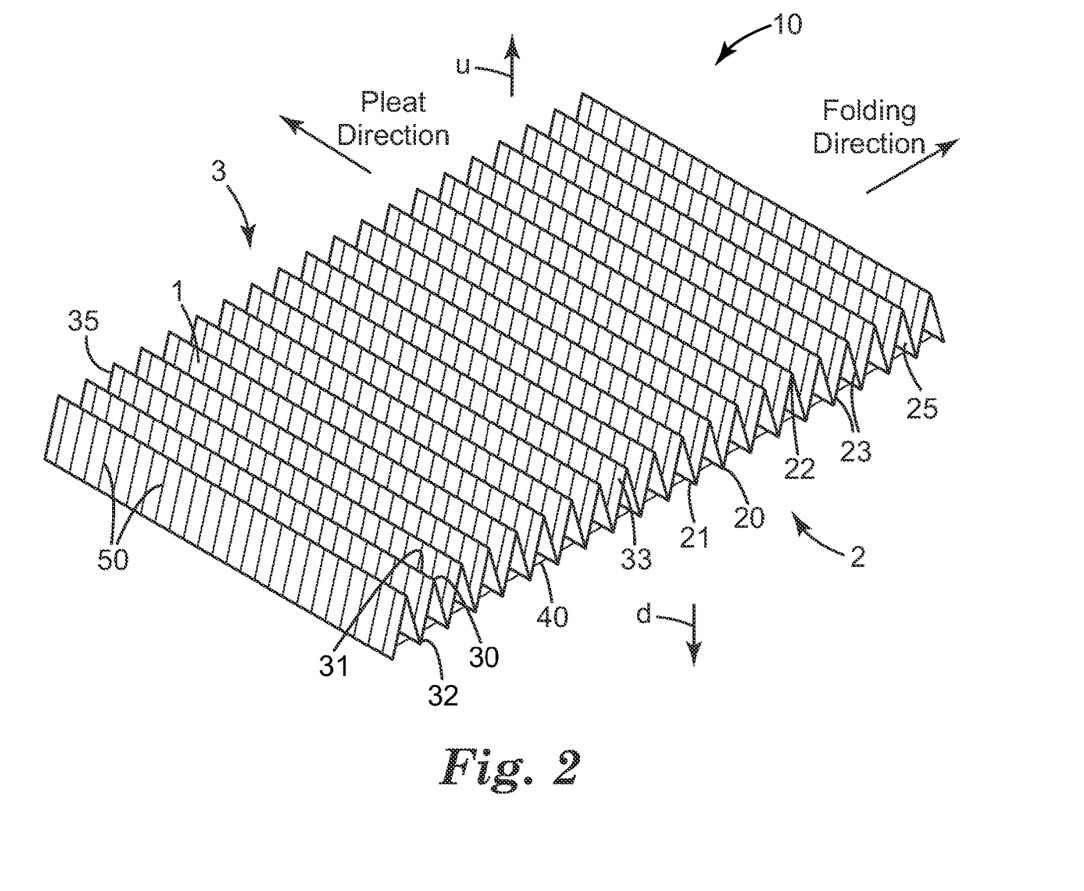
FIG. 2 is a perspective view from the upstream side of an exemplary pleated air filter media, depicting continuous-contact filaments on a downstream face of the pleated air filter media.
Figure 3:
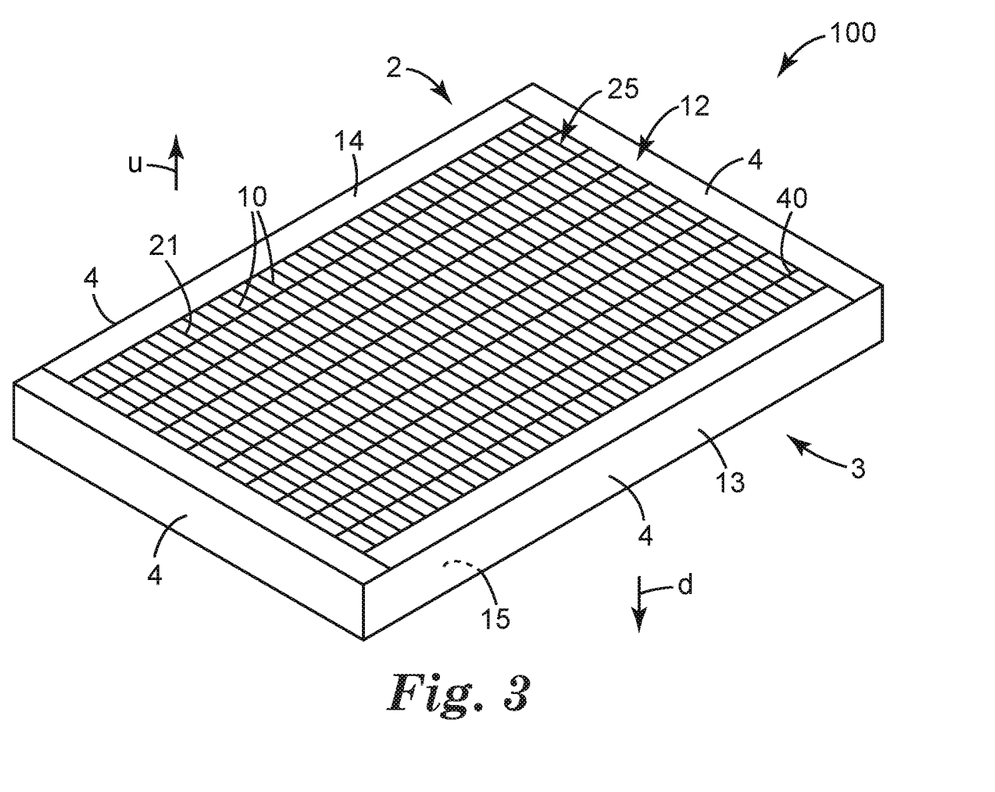
FIG. 3 is a perspective view from the upstream side of an exemplary framed air filter.

Disclosed herein is a pleated air filter media 10, shown in FIG. 1 in perspective view from upstream side 2, and shown in FIG. 2 in perspective view from downstream side 3. Pleated air filter media 10 comprises pleated fibrous air-filtration web 1. In some embodiments a perimeter support frame 12 may be mounted generally on, and surrounding, the perimeter of pleated filter media 10 to form a framed air filter 100 as shown in exemplary embodiment in FIG. 3. In some embodiments pleated filter media 10 may have a generally rectangular perimeter (which does not preclude irregularities, notches, chamfered or angled corners, or the like, in the perimeter of filter media 10) with four major edges 4 as indicated in FIG. 3. Pleated air filter media 10 comprises an upstream face 25 and a downstream face 35. As most easily seen in FIG. 1, pleated filter media 10 comprises a plurality of upstream pleats 20, oriented in at least generally parallel relation to each other. Each upstream pleat 20 comprises an upstream pleat tip 21 and each adjacent pair of upstream pleats 20 comprises pleat walls 23 that meet to define an upstream pleat valley 22 therebetween. In use of filter media 10, flowing air enters upstream valley 22 and passes into upstream pleat walls 23 so as to penetrate into pleated filter media 10.

As most easily seen in FIG. 2, pleated filter media 10 further comprises a plurality of downstream pleats 30, in generally parallel relation to each other and in oppositely-facing configuration from upstream pleats 20. Each downstream pleat 30 comprises a downstream pleat tip 31 and each adjacent pair of downstream pleats 30 comprises pleat walls 33 that meet to define a downstream pleat valley 32 therebetween. Flowing air passes out of downstream pleat walls 33 so as to exit pleated filter media 10.

Pleated filter media 10 will exhibit a Pleat Direction (as indicated in FIGS. 1 and 2) that is defined by the long axes of pleats 20 and 30. Pleated filter media 10 will also exhibit a Folding Direction as indicated in these Figures. The Folding Direction of a media is the overall direction along which the media is folded (i.e., "accordionized", e.g. from a previously-flat configuration) to assume a pleated configuration. The Folding Direction is orthogonal to the Pleat Direction and is orthogonal to the upstream/downstream direction of the resulting pleated media.

As disclosed herein, pleated air filter media 10 comprises a plurality of linear bridging filaments 40 on at least the upstream face 25 of pleated filter media 10, and a plurality of continuous-contact filaments 50 on at least the downstream face 35 of pleated filter media 10. Pleated air filter media 10 thus comprises a plurality of linear bridging filaments 40 at least on upstream face 25 of pleated filter media 10, as seen most easily e.g. in FIG. 1. At least portions of at least some of the bridging filaments 40 are extrusion-bonded to at least portions of at least some of the upstream pleat tips 21 of pleated filter media 10. A bridging filament is a filament that extends between, and is extrusion-bonded to, at least two same-side (e.g., upstream) pleat tips of pleated filter media 10. By definition, a linear bridging filament is not pleated along with the pleated filter media 10. Furthermore, a linear bridging filament is in discontinuous contact with the pleated material and does not follow the pleated geometry or droop to any significant extent into the pleat valleys.

It will thus be appreciated that (with pleated media 10 in a condition in which it is not subject to any deforming or compressing force) linear bridging filaments 40 will comprise an at least substantially linear appearance when viewed from the side, along the Pleat Direction (rather than exhibiting a linear appearance only when viewed directly along the upstream-downstream axis of the pleated media), as evident in the exemplary depiction of FIG. 1. Even allowing for occasional slight deviations as may statistically occur in production processes, most portions of most bridging filaments 40 will be spaced away from the majority of the area of the pleat walls; that is, they will be spaced apart from all such pleat wall areas except those at, or very close to, the pleat tips. Upstream bridging filaments 40 are thus by definition in discontinuous contact with the upstream face 25 of pleated filter media 10. A bridging filament is thus distinguished from a strand that is formed by depositing a bead of hardenable liquid material onto a medium that is already in a pleated configuration so that the liquid conforms to the pleated structure (e.g. flows into the pleat valleys) and is then hardened in that configuration. A linear bridging filament as disclosed herein thus by definition excludes, for example, strands of the type disclosed in U.S. Patent 7235115.

In some embodiments of the general type shown in FIG. 1, the overall long axis of each bridging filament 40 will, on average, be oriented at least generally, substantially or essentially orthogonal to (e.g., within +/−about 5 degrees of 90 degrees to) the Pleat Direction of pleated filter media 10 (with Pleat Direction meaning a direction parallel to pleat tips 21 and 31, as signified by the Pleat Direction arrows in FIG. 1). In some embodiments, the entirety of all bridging filaments 40 may be oriented at least essentially orthogonal to the Pleat Direction. In some embodiments, the entirety of all bridging filaments 40 may be at least generally, substantially, or essentially locally parallel to each other.

In some embodiments, bridging filaments 40 may extend between, and be bonded to, e.g. three, four, eight, sixteen, thirty-two, or more upstream pleat tips 21. In some embodiments, at least some bridging filaments may be continuous, meaning that they extend along the entire length of pleated filter media 10 (as in the exemplary design of FIG. 1). Such continuous bridging filaments thus will not be severed or otherwise made discontinuous anywhere along the entire length of pleated filter media 10. In any case, a bridging filament 40 (continuous or not) will be distinguished from filaments that are cut or otherwise deliberately made so short that they do not extend between at least two upstream pleat tips.

In some embodiments upstream bridging filaments 40 are the only bridging filaments present on pleated air filter media 10. In other embodiments, a second set of bridging filaments may be present on the downstream face of pleated media 10. The first and second sets of bridging filaments may be similar or the same in composition (and/or in geometric parameters such as e.g. spacing, diameter, and so on); or they may differ in any or all such composition and/or parameters.

In various embodiments, bridging filaments may comprise an average diameter (or equivalent diameter in the case of filaments with a non-circular or irregular cross-section) of at most about 3, 2.5, 2.0, 1.5, 1.0, or 0.5 mm. In further embodiments, the filaments may comprise an average diameter or equivalent diameter of at least about 0.10, 0.20, 0.40, or 0.80 mm. Bridging filaments may comprise any suitable shape when viewed in cross section, (e.g., generally round, square, oblong, etc.). All such dimensions and shapes should be evaluated at locations between the pleat tips rather than at the bond to the pleat tips, since in some instances local deformation of the filament shape may occur at the bond locations. Bridging filaments can comprise suitable spacings (i.e., center-to-center spacing) between individual filaments as desired. In various embodiments, the average filament spacing can be at least about 2, 4, 6, 8, 16 or 24 mm. In additional embodiments, the average filament spacing can be at most about 50, 40, 30, 20, 15, 12, 10, or 8 mm. The filament spacings can be relatively constant or can be varied. Some inherent variation in filament spacing may occur in production and handling of filaments, of course. Regardless of the specific arrangements, a suitable set of bridging filaments will have the filaments arranged in a highly open structure (in various embodiments, comprising greater than at least 80, 90, or 95% open area) so as to allow sufficient airflow into pleated filter media 10.

Bridging filaments thus take the form of individual filaments that are individually provided (e.g., extruded onto pleat tips of pleated filter media 10). In at least some embodiments, bridging filaments are not connected with each either directly, or indirectly by way of any other entity (except for the pleated filter medium). Such embodiments preclude the use of filaments that are part of a pre-existing entity (e.g. scrim) that is e.g. bonded to pleat tips of a pleated media. Moreover, a set of bridging filaments as disclosed herein will be distinguished from a non-filamentary support structure or structures that are provided on the downstream side of a pleated filter (and that are often bonded to a perimeter frame thereof and/or are bonded to the pleated filter media itself) to rigidify the pleated filter media. In other words, a set of bridging filaments as disclosed herein does not encompass e.g. perforated sheets of cardboard or metal, or strips of cardboard or metal, as are often provided on the downstream side of a pleated filter to enable the pleated filter to withstand the forces encountered in a high-pressure HVAC airflow condition in the absence of a filter-support layer. In some embodiments, no such ancillary components (e.g. perforated sheets, strips, and so on) are present. In other embodiments, any such ancillary components may be present in addition to the bridging filaments. In some particular embodiments the pleated air filter does not include any kind of reinforcing layer (e.g. a wire mesh) that is bonded (e.g. adhesively bonded) to a major surface of the media and is pleated along with the media.

Pleated air filter media 10 comprises a plurality of continuous-contact filaments 50 at least on downstream face 35 of pleated filter media 10, as seen most easily e.g. in FIG. 2. By definition, continuous-contact filaments 50 are in continuous contact with a face of pleated air filter media 10 and are pleated along with fibrous air-filtration web 1 to comprise pleated filter media 10;

A continuous-contact filament 50 is a filament that is disposed on, and bonded to a face of, a fibrous air-filtration web 1 before the web is pleated to provide pleated air filter media 10. In other words, a continuous-contact filament is disposed on a face of a fibrous web while the web is in a "flat" configuration, after which the web is pleated to provide a pleated air filter media 10. The term "flat" is used for convenience to distinguish from a pleated configuration; it will be appreciated that in many embodiments the "flat" web may exhibit slight curvature along one dimension e.g. by virtue of being in contact with a backing roll at the time that the filament is disposed on the web and/or by being rolled into a jumbo thereafter. (A "flat" web as disclosed herein is thus a web that exhibits a Gaussian curvature of zero.) After the web is pleated, a continuous-contact filament will follow the pleated structure of the pleated media so as to be in continuous contact with the face of the media without any gaps or interruptions in which the filament is not in contact with the face of the media. Thus for example, exemplary continuous-contact filaments 50 disposed on downstream face 35 of pleated media 10 as shown in FIG. 2, are in contact with downstream pleat walls 35 and downstream pleat valleys 32 rather than only being in contact with downstream pleat tips 31 in the manner of a downstream bridging filament.

As is evident from FIG. 2, in some embodiments continuous-contact filaments 50 may exhibit an at least substantially linear appearance when viewed along the upstream-downstream direction of the resulting pleated air filter media (in similar manner to the exemplary bridging filaments 40 shown in FIG. 2). However, unlike bridging filaments, continuous-contact filaments 50, when viewed along the Pleat Direction of the media, will exhibit a shape that at least substantially follows the pleated contours of the pleated media.

As evident from FIG. 2, in some embodiments the overall long axis of each continuous-contact filaments 50 will, on average, be oriented at least substantially orthogonal to (e.g., within +/−about 5 degrees of 90 degrees to) the Pleat Direction of pleated filter media 10. In some embodiments, the entirety of all filaments 50 may be oriented at least essentially orthogonal to the Pleat Direction. In some embodiments, the entirety of all filaments 50 may be at least generally, substantially, or essentially aligned with the Folding Direction of pleated filter media 10. In some embodiments, some or all continuous-contact filaments 50 may be at least generally, substantially, or essentially locally parallel to each other. In some embodiments, continuous-contact filaments 50 may be oriented at least generally, substantially, or essentially parallel to the aforementioned linear bridging filaments 40. In some embodiments, filaments 50 may be spaced, e.g. evenly spaced, along the Pleat Direction of the pleated media, again as is evident in the exemplary design of FIG. 2. Filaments 50 can comprise suitable spacings between individual filaments as desired. In various embodiments, the filament spacing can be at least about 0.2, 0.4, 0.6, 0.1, 1.0, 1.5, 2, 4, 6, 8, or 10 mm. In additional embodiments, the filament spacing can be at most about 12, 8, 7, 5, 3, or 2 mm. The filament spacings can be substantially or essentially uniform or can be varied. Regardless of the specific arrangements, a suitable set of continuous-contact filaments will be disposed on a major surface of a pleated media so that the pleated media retains a large (e.g. >80) percentage of its total area in a condition in which it is not occluded by the continuous-contact filaments, so as to allow sufficient airflow through pleated filter media 10. Thus in various embodiments, continuous-contact filaments 50 may occupy less than 10, 8, 6, 4, 1 or 1 percent of the total area of a major surface of pleated media 10.

Continuous-contact filaments 50 may comprise any desired average diameter (disregarding any optional locally-thinned bending zones of the type mentioned below, if such zones are present). It is noted that the term diameter (as applied to both continuous-contact filaments and the above-described bridging filaments) encompasses an equivalent diameter which is used in the case of filaments with a non-circular or irregular cross-section. The equivalent diameter will be the diameter of a circle having the same area as the non-circular shape in question. In various embodiments, the average diameter of continuous-contact filaments may be at most about 3.0, 2.5, 2.0, 1.5, 1.0, 0.9, 0.8, 0.7, 0.6, 0.5, 0.4, 0.3, 0.2, or 0.1 mm. In further embodiments, the continuous-contact filaments may comprise an average diameter of at least about 0.05, 0.10, 0.20, 0.30, 0.40, 0.50, 0.60, 0.70, or 0.80 mm.

As disclosed herein, a filament 50 is extrusion-bonded to a face of a fibrous web and is (along with bridging filaments) distinguished from fibers that form the fibrous web itself. (e.g., fibers that were originally collected to form a nonwoven fibrous web). In various embodiments, the average diameter of continuous-contact filaments 50 (again disregarding any locally-thinned bending zones, if present) may be greater than the average diameter of the fibers of fibrous web 1 by a factor of at least 5, 10, 20, 40, 80, or 100. In various embodiments the continuous-contact filaments 50 may exhibit an average diameter that is significantly smaller than that of the bridging filaments 40, such that the ratio of the average diameter of the bridging filaments to that of the continuous-contact filaments is at least 2.0, 3.0, 4.0, or 5.0. (All such averages will be obtained from number-average calculations based on the numbers of fibers with particular diameters, not based on weight-average calculations using the weight fibers comprising particular diameters.)

Continuous-contact filaments 50 may comprise any suitable shape when viewed in cross section, (e.g., generally round, rectangular, oblong, etc.). Such shapes may depend for example on the viscosity of the (semi-molten) extrudate as it hits the surface of web 1 or of a support (backing) roll, the tendency of the extrudate wet into web 1 or to spread over the surface of web 1 or of a support roll, etc. Continuous-contact filaments 50 are filaments that are individually provided (e.g., extruded onto a major surface of fibrous air-filtration web 1 e.g. as described in detail later herein) and are not connected with each either directly, or indirectly by way of any other entity (except for the pleated filter medium). This thus excludes filaments that are e.g. part of a pre-existing entity (e.g. a scrim) that is attached, as a whole, to a face of a fibrous web. Moreover, any such set of continuous-contact filaments as disclosed herein will be distinguished from a non-filamentary support structure or structures of the type described earlier herein.

A continuous-contact filament 50 as disclosed herein is also distinguished from a strand that is formed by depositing a bead of hardenable liquid onto a fibrous web that is already in a pleated configuration so that the liquid conforms to the pleated structure (e.g. flows into the pleat valleys) and is then hardened. A continuous-contact filament as disclosed herein thus excludes, for example, strands of the type disclosed in U.S. Pat. No. 7,235,115. A continuous-contact filament as disclosed herein is also distinguished from filaments, strands, or in general, any elongate item that is bonded only to pleat tips and does not follow the pleated structure. A continuous-contact filament as disclosed herein thus excludes, for example, bridging filaments as described earlier herein.

In some embodiments, at least some of continuous-contact filaments 50 may optionally comprise a plurality of locally-thinned bending zones that are spaced along the elongate length of each filament and are thus spaced along a Folding Direction of pleated media 10. Each bending zone will be registered with a pleat tip or a pleat valley. Such bending zones can enhance the ability of a fibrous web that comprises continuous-contact filaments to fold along desired folding lines to assume a pleated configuration, e.g. without the necessity of scoring the fibrous web. Continuous-contact filaments with locally-thinned bending zones are described in detail in U.S. Provisional Patent Application No. 62/714,186; entitled PLEATED AIR FILTER WITH REINFORCING FILAMENTS COMPRISING LOCALLY-THINNED BENDING ZONES, which is incorporated by reference herein in its entirety.

As described in detail herein, the presently disclosed arrangement provides a pleated air filter media 10 that comprises continuous-contact filaments 50 on at least a downstream face of the media, and that comprises linear bridging filaments 40 on at least an upstream face of the media. The continuous-contact filaments 50 are disposed on a fibrous web 1 in a "flat" condition, after which the web is pleated to form pleated air filter media 10. After this, the linear bridging filaments 40 are disposed on the pleat tips of at least an upstream face of the pleated media.

It will be appreciated that the presence of continuous-contact filaments 50 can enhance the ability of a fibrous web to be pleated; for example such filaments can render even a relatively limp and pliable web sufficiently stiff to enable it to be pleated. It will also be appreciated that once the pleats are formed, the presence of linear bridging filaments can help stabilize the pleats, help maintain the desired pleat spacing, and so on.

It is noted that advantages have been found to result from the combination of the continuous-contact filaments and the bridging filaments, above and beyond such advantages as might be expected to result from the presence of each type of filament considered separately. Specifically, the overall rigidity and resistance to deformation of the pleated air filter media 10 is enhanced by the presence of both types of filaments. That is, in qualitative evaluations it appears that the combination of the bridging filaments and the continuous-contact filaments allow a pleated media 10 to behave as if it comprises a large number of interconnected triangular truss elements. This has been found to impart pleated filter media 10 with excellent resistance to compression along the Folding Direction of the pleated media. That is, bridging filaments as defined and described herein as not folding or drooping into pleat valleys to any significant extent will at least substantially maintain this linearity even when pleated media 10 is subjected to moderate compression along the Folding Direction. By moderate compression is meant placing a pleated media on a horizontal surface, e.g. a tabletop, with the upstream side of the media contacting the horizontal surface, and using manual pressure to apply a moderate compressing force (e.g., in the range of 2 pounds) along the Folding Direction. When subjected to moderate compression along the Folding Direction in this manner, a pleated media as disclosed herein will not exhibit any significant compression (as manifested by a reduction in the pleat spacing). Rather, the linear bridging filaments will resist any such compression, to the point that upon the application of higher and higher compressing force, the pleated media will finally buckle, arch or otherwise deform as a whole before any significant reduction in the pleat spacing occurs.

Thus, a pleated media 10 as disclosed herein, bearing continuous-contact filaments on at least a downstream face and bearing bridging filaments on at least an upstream face, is incompressible along its Folding Direction, meaning that it will not deform more than 15% (i.e., will exhibit an average reduction in pleat spacing of no more than 15%) when subjected to the above-described moderate compression along its folding direction. In various embodiments it will deform less than 10% or 5%.

A pleated filter media as disclosed herein is thus advantageously rigidified along its Folding Direction, which can improve the performance of pleated filter media in use. However, this does have the potential drawback that the media cannot be compressed (accordionized) to any significant extent along its Folding Direction e.g. to save space during shipping or storage. This notwithstanding, it has been found that the arrangements disclosed herein unexpectedly allow the pleated media to be compressed along its lateral direction (i.e., a direction that is aligned with the Pleat Direction of the media). That is, upon application of moderate compression force as described above, but along the lateral direction rather than along the Folding Direction, the pleated media can be controllably compressed along its lateral direction to a significant extent. This can provide that even though the pleats of the pleated media are stabilized by the combination of bridging filaments and continuous-contact filaments, the media can nevertheless be compressed e.g. for shipping or storage.

Figure 4:
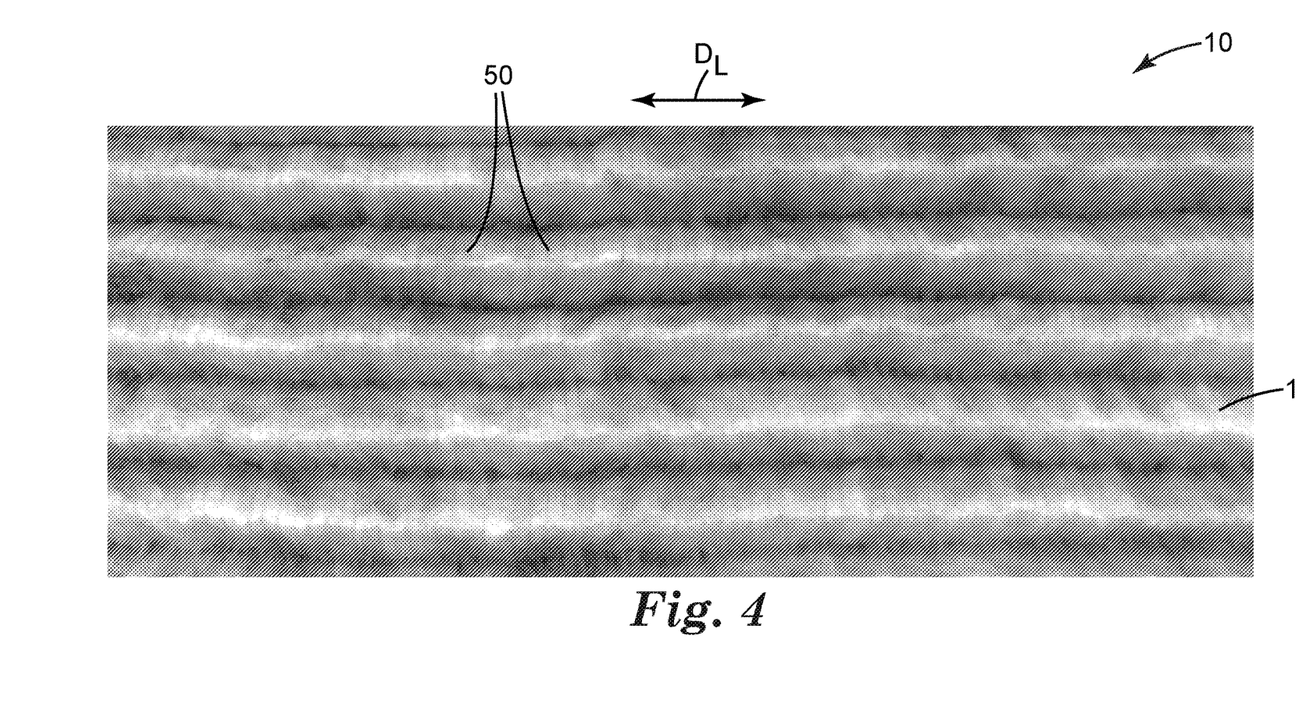
FIG. 4 is a optical photograph of a downstream face of a portion of an exemplary Working Example pleated air filter media in an uncompressed condition.
Figure 5:
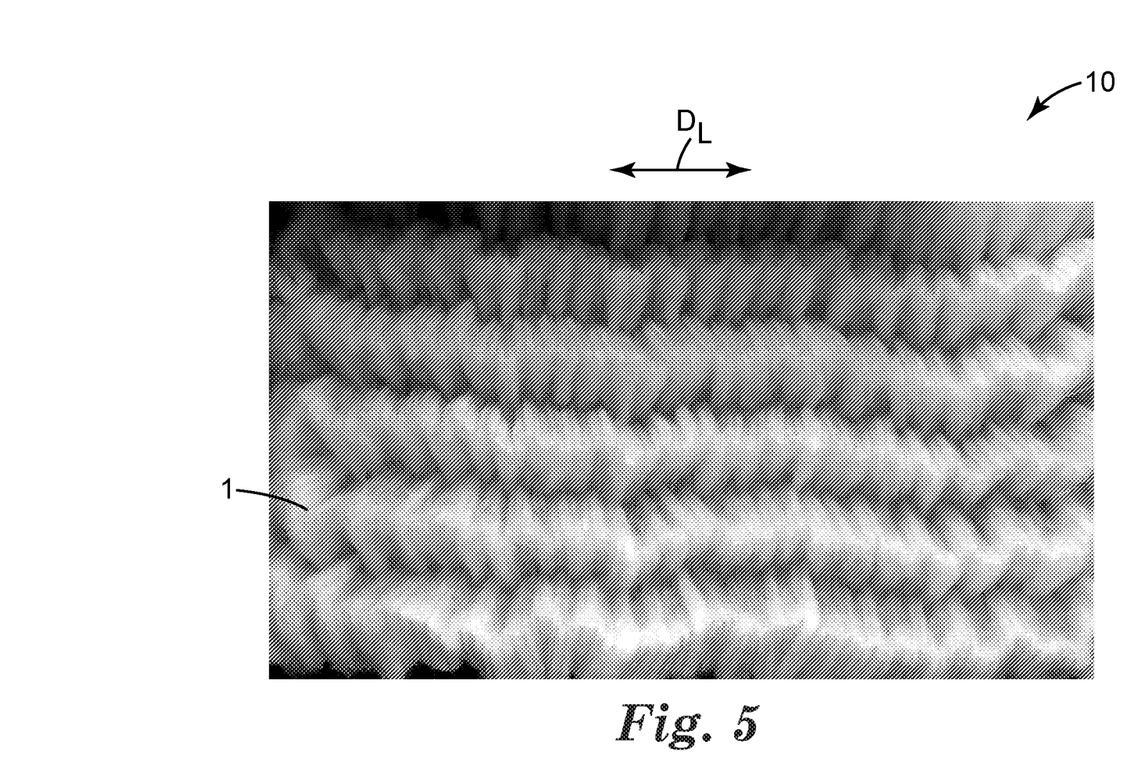
FIG. 5 is an optical photograph of a downstream face of a portion of an exemplary Working Example pleated air filter media in a laterally-compressed condition.

This is demonstrated by comparison of FIGS. 4 and 5, which are optical photographs of portions of Working Example pleated media 10 (comprising both continuous-contact filaments and bridging filaments, although the bridging filaments are facing away from the camera and hence are not visible in these photographs). FIG. 4 depicts a Working Example sample that is lying on a horizontal tabletop in an uncompressed condition (e.g. not subjected to any compressing force along any direction). FIG. 5 depicts a sample similarly lying on a tabletop and having been subjected to manually-applied moderate compressing force along the lateral direction (DL) of the sample. It has been found that the combination of the continuous-contact filaments and the bridging filaments seems to stabilize the pleated media as a collection of numerous generally triangular-shaped regions. When moderate lateral compression is applied, the triangular regions move toward each other and bunch up together as is evident in FIG. 5. Rather, the deformation seems to occur by way of the fibers of the fibrous media locally bending in the spaces laterally between the continuous-contact filaments accompanied by slight shifting of neighboring triangles relative to each other, along the folding direction of the media, as is also evident in FIG. 5. This occurs without any damage or permanent effects; thus the media can be held in this laterally-compressed configuration for a desired time after which it can be re-expanded e.g. to its original uncompressed configuration of FIG. 4. The media can thus be stored or shipped in a compressed configuration after which it can be expanded and, for example, a perimeter support frame mounted thereon. This ability of the pleated media to be laterally compressed and expanded also allows the dimensions of the pleated media (e.g. when provided unframed or with a size-adjustable frame) to be laterally adjustable so that the media can be fit into an installation location (e.g. in an air-handling system) that has a particular lateral width. In this regard, it has been found that even when significantly laterally compressed (e.g. to a compression ratio of 1.5 as discussed below) the pleated media does not exhibit a significant change in resistance to airflow or in filtration performance. It will be appreciated that the arrangements disclosed herein are distinguished from conventional approaches in which a pleated media is compressible along its Folding Direction and incompressible along its Pleat Direction.

It is thus evident that the combination of bridging filaments and continuous-contact filaments achieves an unexpected, synergistic effect that is advantageous. The lateral compressibility of a pleated media can be quantified in terms of a lateral compression ratio, which is the ratio of the original (uncompressed) lateral dimension of a pleated filter media, to the lateral dimension of the pleated filter media when subjected to a moderate lateral compression force as described above. In various embodiments, a pleated filter media as disclosed herein may exhibit a lateral compression ratio of at least 1.3, 1.4, 1.5, 1.6, 1.7, 1.8, 2.0, 2.5, 3.0, 3.5, 4.0, 5.0, or 6.0.

It will be understood that the following descriptions of suitable filament compositions and properties is applicable to both linear bridging filaments 40 and continuous-contact filaments 50. Filaments 40 and/or 50 may be made of any material that can be extruded as filaments and extrusion-bonded to a fibrous media. Such materials may include any suitable extrudable thermoplastic or thermoset organic polymeric materials (whether naturally occurring or synthetic). Thus, common extrudable polymeric materials (including but not limited to polyolefins such as e.g. polypropylene, polyethylene, and copolymers thereof; poly(lactic acid); polyamides; polyethylene terephthalates; and so on), may be used to form the bridging filaments. Such extrudable organic polymeric materials are often comprised of relatively high molecular weight polymers, copolymers or blends. Other, minor constituents may be present, e.g. antioxidants, colorants, pigments, dyes, processing aids, and so on.

In some embodiments, filaments 40 and/or 50 may be non-elastic. Non-elastic as defined herein encompasses any solid material that does not have the relatively high reversible extensibility (exemplified e.g. by the ability to be reversibly elongated to e.g. 100% or more without undergoing plastic deformation) characteristic of elastic materials such as natural rubber, SBR rubber, lycra, etc. In some embodiments, such filaments may be made of a material that exhibits a Young's modulus of at least 1.0, 2.0, or 3.0 GPa.

In some embodiments, filaments 40 and/or 50 may be compositionally compatible with, compositionally similar to, or essentially compositionally identical to, the fibers of the nonwoven web to which the filaments are extrusion-bonded. These concepts are defined and described in detail in U.S. Provisional Patent Application No. 62/346,179 and in corresponding PCT International Publication No. WO2017213926, both of which are incorporated by reference herein in their entirety for this purpose. It is noted that even in the absence of the filaments being e.g. at least compositionally similar to the organic polymeric material of the fibers of the fibrous air-filtration web (and in the absence of the material of the filaments exhibiting any pressure-sensitive adhesive properties), adequate bonding of filaments to the fibrous web may occur. Such bonding may be achieved e.g. by way of the semi-molten material of the incipient filament penetrating into interstitial spaces between the fibers of the web.

By definition, extrusion-bonded filaments are not comprised of any kind of (hardened) glue or adhesive, e.g. drizzle glue or photocured adhesive. In particular, an extrusion-bonded filament is not comprised of a hot melt adhesive composition. Hot melt adhesives as commonly used are well known as comprising a base material (e.g. a polymeric material) blended with significant amounts of other components (such as e.g. organic waxes) to reduce the melting point and/or the melt viscosity of the mixture so that it can be processed with hot-melt adhesive equipment (e.g. grid-melters and metering pumps) rather than necessitating the use of an extruder. (Hot melt adhesives may also often comprise components such as tackifiers to increase the tackiness of the mixture.) As such, hot melt adhesives (even after being cooled and hardened) are readily distinguished from extrusion-bonded materials as disclosed herein, as will be appreciated by ordinary artisans. For example, hot melt adhesives disclosed in U.S. Patent 7235115 are distinguished from extrusion-bonded linear bridging filaments as disclosed herein. In some embodiments, filaments 40 and/or 50 may be comprised of an organic polymeric material that is an electret-comprising composition, as discussed later herein.

Pleated filter media 10 may comprise any suitable fibrous air-filtration web that includes at least some fibers that are capable of having filaments extrusion-bonded thereto. Potentially suitable materials may take any form including e.g. nonwovens, such as melt blown or spunbond webs of synthetic or natural fibers; scrims; woven or knitted materials and so on. Any suitable method of making a nonwoven web (e.g., melt-blowing, melt-spinning, air-laying, carding, and so on) may be used. Filter media 10 may also include sorbents, catalysts, and/or activated carbon (whether in the form of e.g. granules, fibers, fabric, and molded shapes).

Multilayer media, e.g. laminated media, can also be used as filter media 10. Such media may consist of laminated layers of the media discussed above or of other substrates laminated to one or more layers of filter media, for example. In some embodiments, a prefilter layer may be used on the upstream side of filter media 10. Such a prefilter layer may comprise e.g. polypropylene, polyethylene, polyethylene terephthalate, poly(lactic acid), or blends of these materials. In other words, in some embodiments pleated filter media 10 may comprise a base (e.g., filtration) layer, along with any other layer or layers as desired for any purpose. For example, a highly open plastic netting or mesh might be laminated to the pleated media, in order to e.g. enhance the abrasion resistance of the media. Any such layer may be bonded to e.g. a base (e.g. filtration) layer by any suitable method, e.g. by melt-bonding, by way of an adhesive (hot melt adhesive, pressure-sensitive adhesive, and so on), calendering, ultrasonic bonding, etc. However, in some embodiments no layer of any kind will be present on pleated filter media 10.

Regardless of the specific physical form of the filter media (e.g. whether a woven or knitted material, a nonwoven material, etc.) the media will include sufficient components (e.g. fibers) that are made of an organic polymeric material to which bridging filaments can be extrusion-bonded. In some embodiments, the filter media includes polyolefinic fibers (e.g. polyethylene, polypropylene and copolymers thereof). In some specific embodiments, a filter media comprises, or consists essentially of, polypropylene fibers (noting that this latter condition does not preclude the presence of e.g. electret moieties, and/or processing additives, UV stabilizers and so on, as are customarily used with polypropylene). Regardless of the specific composition, the filtration media may be chosen so that filaments 40 and/or 50 may be selected that are compositionally compatible therewith. In various embodiments, a nonwoven web (e.g. a spunbond or meltblown web) comprised of, or consisting essentially of, polypropylene homopolymer fibers may be used in combination with bridging filaments 40 and/or continuous-contact filaments 50 that are likewise comprised of, or consist essentially of, polypropylene homopolymers.

In specific embodiments, pleated filter media 10 may be an electret material, comprised of e.g. any charged material, e.g. split fibrillated charged fibers as described in U.S. Patent RE 30782. Such charged fibers can be formed into a nonwoven web by conventional means and optionally joined to a scrim such as disclosed in U.S. Pat. No. 5,230,800 forming an outer support layer. In other specific embodiments, filter media 10 can be a melt blown microfiber nonwoven web, e.g. such as disclosed in U.S. Pat. No. 4,813,948, which can optionally be joined to a secondary layer during web formation as disclosed in that patent, or subsequently joined to a secondary web in any conventional manner. Filtration media that may be particularly suitable for certain applications might include e.g. media of the general type described in U.S. Pat. No. 8,162,153 to Fox; media of the general type described in U.S. Patent Application Publication 20080038976 to Berrigan; and, media of the general type described in U.S. Patent Application Publication 20040011204 to Both, and media generally known as tribocharged media. Any such media can be charged to form an electret, if desired.

Because the presence of continuous-contact filaments 50 may provide enhanced stiffness that increases the pleatability of even a relatively limp and pliable material, and because the presence of linear bridging filaments 40 can stabilize pleats formed in such a material, the arrangements disclosed herein may allow the formation of a pleated structure even in a media 10 (e.g. a fibrous web 1) that exhibits (in the absence of the filaments) a relatively low stiffness. It will be appreciated that such materials historically have required, for example, the use of a supporting wire mesh in order to be successfully provided in a pleated form. In various embodiments, pleated filter media 10 may be comprised of a fibrous web that exhibits a Gurley Stiffness (in the absence of continuous-contact filaments and bridging filaments, measured in an unpleated configuration) of less than 200, 150, 100, 75, or 50 mg.

In some embodiments, pleated media 10 may comprise (e.g., may consist of, along with the aforementioned filaments) a fibrous air-filtration web 1 that is a meltspun, e.g. spunbonded, nonwoven web. Spunbonded webs that may be particularly suitable include e.g. those of the general type described in U.S. Patent Application Publication 20080038976 to Berrigan. In some embodiments, a spunbonded web may be a high-loft spunbonded web. As used herein, this signifies a web that exhibits a solidity of less than 8.0%. High-loft spunbonded webs, methods of making high-loft spunbonded webs, and methods of measuring solidity of webs, are disclosed in U.S. Pat. No. 8,162,153 to Fox, which is incorporated by reference herein in its entirety. In some embodiments, a spunbonded web may be a relofted spunbonded web. Such materials are described in U.S. Provisional Patent Application No. 62/714,188, entitled AIR-FILTER MEDIA COMPRISING A RELOFTED SPUNBONDED WEB, AND METHODS OF MAKING AND USING and filed on 3 Aug. 2018), which is incorporated by reference herein in its entirety. Other such materials are described in International (PCT) Patent Application No. PCT/CN2018/098455, entitled AIR-FILTER MEDIA INCLUDING A RELOFTED SPUNBONDED WEB, AND METHODS OF MAKING AND USING and filed on 3 Aug. 2018), and in the resulting U.S. patent application Ser. No. 17/263,793, entitled AIR-FILTER MEDIA INCLUDING A RELOFTED SPUNBONDED WEB, AND METHODS OF MAKING AND USING), both of which are incorporated by reference herein in their entirety. Any such media can be charged to form an electret, if desired.

The pleat height, pleat spacing, and pleat-tip radius of curvature of pleated air filter media 10 (and thus of fibrous air-filtration web 1 which provides, or is a layer of, air filter media 10) may be in any suitable range, and may be evaluated according to the descriptions in U.S. Provisional Patent Application 62/346,179 and in corresponding PCT International Publication No. WO2017213926, both of which are incorporated by reference herein in their entirety for this purpose. In various embodiments, the pleat height of media 10 can be at least about 6, 8, 10, 12, 14, 16, 18, 20, 30, or 40 mm. In further embodiments, the pleat height may be at most about 120, 100, 80, 60 42, 32, 22, 20, 15, 12, 10, or 8 mm. In various embodiments the pleat spacing may be at most about 12, 10, 8, 6 or 4 mm. In further embodiments the pleat spacing may be at least about 3, 5, 7, 9 or 11 mm. In various embodiments, the radius of curvature of the pleat tips may be at most about 4.0, 3.0, 2.0, 1.8, 1.6, 1.4, 1.2, 1.0, 0.8, or 0.6 mm. In further embodiments the radius of curvature of the pleat tips may be at least about 0.5, 0.7, 0.9, 1.1, 1.3, 1.5, or 1.7 mm.

In some embodiments pleated air filter media 10 as disclosed herein may be used as-is (e.g. in the absence of a perimeter support frame), as an air filter. In other embodiments a pleated air filter media 10 as disclosed herein may have a perimeter support frame 12 mounted to the edges thereof to form a framed air filter 100 e.g. as shown in FIG. 3. In some embodiments such a frame may be a channel frame. A channel frame is one in which each major portion of the frame (e.g. of the four portions that are each mounted on a major edge of the pleated air filter media) is at least substantially U-shaped in cross-section. Often, such a frame may comprise upstream and downstream flanges 14 and 15, and sidewalls 13, as shown in exemplary embodiment in FIG. 3. Such channel frames are well known in the art (being described e.g. in U.S. Pat. No. 8,685,129). A frame may take the form of a single piece of material (e.g. a "box" frame) that provides all four frame portions; or it may be formed by attaching two, three, or four frame pieces (e.g., two L-shaped pieces) to each other to form the finished frame. In particular embodiments, a channel frame (e.g. a box frame) may comprise one or more downstream support members (that may collectively form a downstream support grill e.g. of the general type disclosed in U.S. Patent 8685129) that provide downstream support. In other embodiments a perimeter support frame may be a pinch frame (e.g. of the general type disclosed in U.S. Pat. No. 9,174,159). A frame 12 can be made of any suitable material, e.g. molded plastic, chipboard, and so on.

Pleated fibrous air-filtration web 1, hence pleated air filter media 10, may be used as an air filter 100 or as a layer or component of a multilayer air filter 100 in any suitable environment or situation in which moving air, e.g. motivated by a mechanized fan or blower system, is desired to be filtered. Such an air filter 100 may find use e.g. in any air-handling system, including for example HVAC (heating-ventilating-air-conditioning) systems, room air purifiers, automotive engine or cabin-air filtration applications, and so on. In particular embodiments, air filter 100 is configured for use in forced-air HVAC systems. In many convenient embodiments, the bridging filaments are disposed only on the upstream side of the pleated air filter media and the continuous-contact filaments are disposed only on the downstream side of the pleated air filter media. However, in some particular alternative embodiments, the bridging filaments may be disposed only on the downstream side of the pleated filter media with the continuous-contact filaments being disposed only on the upstream side. As noted earlier, in some embodiments bridging filaments may be disposed on both sides of the pleated filter media (regardless of whether the continuous-contact filaments are disposed on both sides, or only on the upstream side, or only on the downstream side, of the pleated filter media). Similarly, in some embodiments continuous-contact filaments may be disposed on both sides of the pleated filter media (regardless of whether the bridging filaments are disposed on both sides, or only on the upstream side, or only on the downstream side, of the pleated filter media).

In general, a pleated air filter media 10 as disclosed herein may be used in any kind of air filter 1, configured for any suitable end use. For example, such an air filter may be, or may be a part of, a personal respiratory protection device. In some embodiments such an air filter may be provided within a filter cartridge that can be fluidly coupled to a mask body to provide a personal respiratory protection device. In other embodiments, such an air filter may be incorporated into a "filtering face-piece" respirator mask. In products of this general type, the mask body itself provides the filtering function. Filtering face-piece respirators often come in one of two configurations: molded (e.g. shaped, into a generally cup-shape so as to fit on a user's face), and flat-fold, that can be supplied in a flat or nearly-flat condition and can then be unfolded and expanded to fit on a user's face. In some embodiments, such an air filter may be used in a so-called "negative-pressure" respirator; that is, a product in which the motive power for moving air is the breathing of a user. Such negative-pressure respirators are often configured as e.g. full-face respirators, half-face respirators, and hoods. In other embodiments, such an air filter may be used in a respirator in which the motive power for moving air is a motorized fan or blower. Such products may include e.g. a PAPR (powered air purifying respirator).

Filaments 40 and/or 50 may be generated by any desired extrusion apparatus and method that will provide streams of molten extrudate in a form in which they can be extrusion-bonded to pleat tips of pleated filter media. By definition, extrusion-bonding as disclosed herein, and extrusion-bonds formed thereby, are distinguished from methods and resulting bonds such as achieved by e.g. ultrasonic bonding, solvent-bonding, bonding by way of pressure-sensitive adhesives or photocurable adhesives, and so on. In other words, an ordinary artisan will be able to distinguish extrusion-bonds from such other bonds. Such an extrusion apparatus may be any kind of extruder (e.g. a single-screw extruder, twin-screw extruder, and so on) that comprises a die with orifices for extruding an organic thermoplastic or thermoset material as molten streams in an at least generally parallel, spaced-apart relationship. Each filament may be formed by extruding a volumetric flowstream of molten material from an orifice of the die. The dimensions of the filaments may be varied e.g. by changing the extruder screw speed and/or by changing the speed at which the pleated media is moved is moved relative to the extruded streams of molten material. In most embodiments, the molten streams will be extruded in a direction this is at least generally aligned with the machine direction (i.e. the longitudinal direction) of the media. Such a direction may be at least generally orthogonal to the pleat direction of the pleated media (in the case of bridging filaments) or at least generally orthogonal to what will become the pleat direction when the media is subsequently pleated (in the case of continuous-contact filaments).

In some embodiments the streams of molten extrudate may be extruded onto a support surface (e.g. a roll with a suitably controlled surface temperature) that presents the streams to the media for bonding thereto. The support surface may also (e.g. by way of cooling the molten streams) facilitate at least an increase in viscosity, or even partial solidification, of the streams into filaments in similar manner to that noted above. The support surface bearing e.g. semi-solidified filaments thereon can be brought into close proximity with the media so that the pleat tips (in the case of forming bridging filaments) or continuous areas of a major surface of the media (in the case of forming continuous-contact filaments) contact the incipient filaments. The paths of the support surface and the media can then diverge so that the filaments separate from the support surface. (The support surface may be treated, or may comprise an outwardmost layer, of any composition that can enhance the ability to separate the filaments from the support surface.) It will be understood that methods in which streams of molten filaments are partially solidified (e.g. by contacting a support surface such as a chill roll) before contacting the fibrous web still fall under the auspices of extrusion-bonding. In some embodiments a pleating apparatus may be set up in-line with an extrusion apparatus so that a fibrous web may be pleated immediately after continuous-contact filaments 50 are extrusion-bonded thereto, as part of an in-line operation.

With particular regard to forming bridging filaments, in many embodiments the molten streams may be brought into contact with the pleat tips after the pleat spacing has been established; and, the pleat spacing is not significantly changed after the molten streams are contacted with the pleat tips. This can ensure that, as noted previously, the thus-produced bridging filaments have an at least substantially linear appearance when viewed from the side (along the pleat direction) and do not follow or contact the pleat walls into the pleat valleys to any significant extent. In some embodiments, the conditions under which the streams of molten thermoplastic organic material are brought to the pleated media may be advantageously controlled. In particular embodiments, the streams of molten extrudate may be cooled, e.g. by being temporarily deposited onto a cooled supporting surface in the manner referred to above, by being passed through moving cooled gas (e.g. air), by being passed through moving ambient air, or even by being passed through quiescent ambient air. Such measures can provide that the streams achieve a desirably high viscosity and/or a degree of partial solidification that allows them to be deposited onto pleat tips and bonded thereto while spanning the pleat valleys rather than e.g. drooping thereinto.

In some embodiments an extrusion apparatus may be set up in-line with a pleating apparatus so that linear bridging filaments may be extrusion-bonded to a pleated filter media immediately after the pleats are formed therein. In other embodiments a pleated filter media may be retained and stored as a pleat pack (in which the pleats may be compressed together (accordionized) for easier storage of the pleat pack). The pleat pack may then be brought to the desired pleat spacing (e.g. it may be expanded from a compressed storage configuration) and the bridging filaments extruded onto pleat tips of at least the upstream face of the pleated media to lock the media in its desired pleated configuration.

In some embodiments, pleated air filter media 10 may be a nonwoven web (e.g. a spunbond nonwoven web) comprising organic polymeric fibers at least some of which comprise electrets. In particular embodiments, bridging filaments 40 and continuous-contact filaments 50 may be made of an organic polymeric material of the same electret-comprising composition as the organic polymeric fibers of the nonwoven web of the pleated air filter media. For example, the spunbond web may be made of polypropylene fibers that comprise electrets, and the filaments may likewise be made of polypropylene that comprises electrets. It will be appreciated that in some embodiments waste material from production of the nonwoven web or from production of pleated filters therefrom (e.g., material that is trimmed away from the web); or, waste fibers resulting from the meltspinning process, can be advantageously used as raw material for extrusion of either or both of filaments 40 and 50. It will thus be appreciated that in some embodiments, filaments 40 and/or 50 may include electrets even though the filaments may not necessarily contribute any significant filtering function.

A fibrous web 1 bearing continuous-contact filaments 50 on at least one major face thereof, can be pleated to provide pleated filter media 10 by any suitable method. (However, the term pleated filter media does not encompass filter media that is formed into a folded or puckered shape by way of the shrinking of a shape-memory polymer that is attached to portions thereof.) Suitable methods might for example use a "corrugating" process in which the web is processed through a set of corrugating gears e.g. as disclosed in U.S. Pat. No. 5,256,231. In general, useful pleating methods may include any in which a web of filter media is fed to a pleating device, which device folds the filter media at desired intervals, with the thus-formed pleats being gathered in a relatively tight pack. The pleated filter media web may then be processed through a pleat spacing device that adjusts and sets the pleats at a desired pleat spacing. One exemplary type of pleat spacing device is described in U.S. Pat. No. 4,976,677 and includes a helical screw conveyor in which the flight or pitch of the screw conveyor windings establishes the desired pleat spacing. Another general type of pleat spacing device is described in U.S. Pat. No. 5,389,175 and includes a conveyor having a plurality of spaced-apart flites or cleats. Individual flites or cleats carry or hold consecutive pleats during movement of the conveyor, such that the resultant pleat spacing is dictated by the spacing between adjacent flights or cleats.

It will be apparent that the above pleating methods typically produce fixed pleat spacings that are predetermined e.g. by a screw conveyor winding spacing or by the spacing between flites or cleats. In other embodiments, a filter media may be pleated by an apparatus and method of the general type described in U.S. Pat. No. 9,808,753, which allows user-selected adjustment of the pleat spacings. In systems of this general type, upper and lower conveyors are operated at selected rates with at least one of the conveyor rates being alterable by a user to establish a desired pleat spacing.

In any of the above methods (whether involving fixed pleat spacings or selectable pleat spacings), in some embodiments the pleating process may be assisted if desired by scoring the filter media to provide score lines along which the filter media is folded to form pleat tips. Such scoring may be performed using any desired apparatus and method, e.g. by the use of a rotary-score pleating apparatus. In any of the above methods, pleats may be heat-set e.g. with one or more infrared heaters. Various aspects of pleating, including scoring and heat-setting, are disclosed in detail in U.S. Pat. No. 7,235,115.

List of Exemplary Embodiments

Embodiment 1 is a pleated air filter media comprising an upstream face and a downstream face and a plurality of oppositely-facing pleats with a pleat direction and with a plurality of upstream pleat tips and upstream pleat valleys and downstream pleat tips and downstream pleat valleys, wherein the pleated air filter media comprises a plurality of upstream linear bridging filaments that are extrusion-bonded to at least some of the upstream pleat tips of the fibrous web, and, wherein the pleated air filter media comprises a plurality of downstream continuous-contact filaments that are extrusion-bonded to the downstream face of the fibrous web.

Embodiment 2 is the pleated air filter media of embodiment 1 wherein a ratio of an average diameter of the upstream linear bridging filaments to an average diameter of the continuous-contact filaments is at least about 3.0:1.0.

Embodiment 3 is the pleated air filter media of embodiment 1 wherein a ratio of an average diameter of the upstream linear bridging filaments to an average diameter of the continuous-contact filaments is at least about 5.0:1.0.

Embodiment 4 is the pleated air filter media of any of embodiments 1-3 wherein the upstream linear bridging filaments are at least substantially parallel to each other, are spaced along the pleat direction, and are oriented at least substantially orthogonal to the pleat direction; and, wherein the downstream continuous-contact filaments are at least substantially parallel to each other; are spaced along the pleat direction, and are oriented at least substantially orthogonal to the pleat direction.

Embodiment 5 is the pleated air filter media of any of embodiments 1-4 wherein the upstream linear bridging filaments comprise an average center-to-center spacing of at least 8.0 mm and wherein the downstream continuous-contact filaments comprise an average center-to-center spacing of at most 4.0 mm.

Embodiment 6 is the pleated air filter media of any of embodiments 1-4 wherein the upstream linear bridging filaments comprise an average center-to-center spacing of at least 10.0 mm and wherein the downstream continuous-contact filaments comprise an average center-to-center spacing of at most 3.0 mm.

Embodiment 7 is the pleated air filter media of any of embodiments 1-6 wherein the pleated air filter media comprises an average pleat height of at least about 20 mm.

Embodiment 8 is the pleated air filter media of any of embodiments 1-7 wherein the pleated air filter media is at least generally incompressible along a folding direction of the pleated air filter media, and wherein the pleated air filter media is at least generally laterally compressible along the pleat direction of the pleated air filter media.

Embodiment 9 is the pleated air filter media of embodiment 8 wherein the pleated air filter media is laterally compressible so that the pleated air filter media exhibits a lateral compression ratio of at least 1.5.

Embodiment 10 is the pleated air filter media of any of embodiments 1-9 wherein the pleated air filter media comprises a nonwoven fibrous web comprising organic polymeric fibers at least some of which are of a composition that comprises electrets.

Embodiment 11 is the pleated air filter media of embodiment 10 wherein the upstream linear bridging filaments and the downstream continuous-contact filaments are organic polymeric materials of the same composition as at least some organic polymeric fibers of the nonwoven fibrous web.

Embodiment 12 is the pleated air filter media of any of embodiments 1-11 wherein the pleated air filter media comprises a nonwoven fibrous web that is a spun-bonded nonwoven web.

Embodiment 13 is the pleated air filter media of embodiment 12 wherein the pleated air filter media consists essentially of a spun-bonded nonwoven web that comprises organic polymeric fibers of a composition that comprises electrets.

Embodiment 14 is the pleated air filter media of any of embodiments 12-13 wherein the spun-bonded nonwoven web is a high-loft web that exhibits a solidity of less than 8.0.

Embodiment 15 is the pleated air filter media of any of embodiments 1-14 wherein the pleated air filter media further comprises a plurality of downstream linear bridging filaments that are at least substantially parallel to each other, are spaced along the pleat direction, are oriented at least substantially orthogonal to the pleat direction, and are extrusion-bonded to at least some of the downstream pleat tips of the fibrous web.

Embodiment 16 is the pleated air filter media of any of embodiments 1-15 wherein the pleated air filter media further comprises a plurality of upstream continuous-contact filaments that are at least substantially parallel to each other, are spaced along the pleat direction, are oriented at least substantially orthogonal to the pleat direction, and are extrusion-bonded to the downstream face of the fibrous web.

Embodiment 17 is an air filter comprising the pleated air-filter media of any of embodiments 1-16.

Embodiment 18 is the air filter of embodiment 17 wherein a perimeter support frame is mounted to four major edges of the pleated air-filter media so that the air filter is a framed air filter.

Embodiment 19 is a method of filtering air, the method comprising positioning the air filter of any of embodiments 17-18 in an air-handling system; and, operating the air-handling system so that moving air is motivated through the pleated air-filter media so as to filter the air motivated therethrough.

Embodiment 20 is a method of filtering air, the method comprising positioning an air filter comprising the pleated air filter media of any of embodiments 1-16 in an air-handling system; and, operating the air-handling system so that moving air is motivated through the pleated air-filter media so as to filter the air motivated therethrough.

Embodiment 21 is a method of making a pleated air filter media comprising upstream linear bridging filaments and downstream continuous-contact filaments, the method comprising: extruding a first plurality of molten streams of organic polymeric material and partially solidifying the molten streams into a plurality of first parallel, spaced-apart, elongate, partially-solidified filaments; bringing the first partially-solidified filaments into contact with a downstream face of a moving, flat, fibrous air-filtration web so that the first partially-solidified filaments are in continuous contact with the downstream face of the fibrous air-filtration web; allowing the first partially-solidified filaments to solidify into downstream continuous-contact filaments that are bonded to the downstream face of the fibrous air-filtration web; then, folding the fibrous air-filtration web into a pleated configuration; extruding a second plurality of molten streams of organic polymeric material and partially solidifying the molten streams into a plurality of second parallel, spaced-apart, elongate, partially-solidified filaments; bringing the second partially-solidified filaments into contact with upstream pleat tips of the pleated fibrous air-filtration web so that the second partially-solidified filaments are in discontinuous contact with the upstream face of the fibrous air-filtration web; and, allowing the second partially-solidified filaments to solidify into upstream linear bridging filaments that are bonded to the upstream pleat tips of the fibrous air-filtration web.

Examples

Test Methods

Solidity

Solidity is determined by dividing the measured bulk density of the nonwoven fibrous web by the density of the materials making up the solid portion of the web. Bulk density of a web can be determined by first measuring the weight (e.g. of a 10-cm-by-10-cm section) of a web. Dividing the measured weight of the web by the web area provides the basis weight of the web, which is reported in $g/m^2$. The thickness of the web can be measured by obtaining (e.g., by die cutting) a 135 mm diameter disk of the web and measuring the web thickness with a 230 g weight of 100 mm diameter centered atop the web. The bulk density of the web is determined by dividing the basis weight of the web by the thickness of the web and is reported as $g/m^3$.

The solidity is then determined by dividing the bulk density of the nonwoven fibrous web by the density of the material (e.g. polymer) comprising the solid filaments of the web. The density of a bulk polymer can be measured by standard means if the supplier does not specify the material density. Solidity is a dimensionless fraction which is usually reported in percentage.

Percent (%) Penetration. Pressure Drop, and Quality Factor

Percent (Particle) Penetration, Pressure Drop and the filtration Quality Factor (QF) of the nonwoven fibrous webs are determined using a challenge aerosol containing DOP (dioctyl phthalate) liquid droplets, delivered (unless otherwise indicated) at a flow rate of 85 liters/min to provide a face velocity of 14 cm/s, and evaluated using a TSI (Registered Trademark) Model 8130 high-speed automated filter tester (commercially available from TSI Inc., Shoreview, MN). For DOP testing, the aerosol may contain particles with a diameter of about 0.185 μm, and the Automated Filter Tester may be operated with the heater off and the particle neutralizer on. Calibrated photometers may be employed at the filter inlet and outlet to measure the particle concentration and the % particle penetration through the filter. An MKS pressure transducer (commercially available from MKS Instruments, Wilmington, MA) may be employed to measure the Pressure Drop (ΔP, mm H2O) through the filter. The equation:

$$QF = \frac{-\ln\left(\frac{\% \text{ Particle Penetration}}{100}\right)}{\Delta P}$$

may be used to calculate QF from the Pressure Drop and Percent (Particle) Penetration.

Dust Holding Capacity (DHC) and Capture Efficiency

The Dust Holding Capacity (and other filtration properties such as e.g. Capture Efficiency, Arrestance, and Minimum Efficiency Reporting Value (MERV)) of filters are measured in accordance with the general methods in ASHRAE Standard 52.2 ("Method of Testing General Ventilation Air-Cleaning Devices for Removal Efficiency by Particle Size").

The Dust Holding Capacity test involves configuring the web as a filter (e.g., a pleated and/or framed filter), installing the filter into a test duct and subjecting the filter to incremental dust loading steps, using a synthetic dust as specified in the ASHRAE 52.2 standard. The Dust Holding Capacity is the total weight of the synthetic dust captured by the air-filter sample over all of the incremental dust loading steps. In the present case, the samples that were tested for Dust Holding Capacity were pleated as described below. The Dust Holding Capacity is reported in grams of dust per test sample.

The Capture Efficiency test involves configuring the web as a filter (e.g., a pleated and/or framed filter), installing the filter into a test duct, and subjecting the filter to potassium chloride particles which have been dried and charge-neutralized. A test face velocity of 1.5 meters/sec may be employed. An optical particle counter may be used to measure the concentration of particles upstream and downstream from the test filter over a series of twelve particle size ranges or channels. The equation:

Capture efficiency (%) =

$$\frac{\text{upstream particle count} - \text{downstream particle count}}{\text{upstream particle count}} \times 100$$

may be used to determine capture efficiency (sometimes referred to as particle removal efficiency) for each channel. Pressure drop across the filter is measured on the clean filter. From the initial efficiency curve, the four efficiency values between 0.3 and 1.0 μm may be averaged to provide the E1 efficiency, the four efficiency values between 1.0 and 3.0 m may be averaged to provide the E2 efficiency, and the four efficiency values between 3.0 and 10.0 m may be averaged to provide the E3 efficiency.

Working Examples

Preparation of Relofted Spunbonded Webs

Relofted spunbonded webs were prepared as described below, using the procedures described in U.S. Provisional Patent Application No. 62/714,188, entitled AIR-FILTER MEDIA COMPRISING A RELOFTED SPUNBONDED WEB, AND METHODS OF MAKING AND USING).

High-loft spunbonded polypropylene webs were obtained. The meltspun fibers had been made and collected in general accordance with the procedures described in the Examples of U.S. Pat. No. 8,240,484. The collected fibers had been autogenously bonded to form self-supporting, spunbonded webs in general accordance with the procedures described in U.S. Pat. No. 9,976,771, and had also been area-bonded using calendering methods of the general manner described in the '484 patent. The area-bonds were estimated to be present at an area percentage of the web of approximately 1.5-1.6%. The webs had been hydrocharged in general accordance with the procedures disclosed in U.S. Patent Application Publication No. 2012/0017910. The webs were obtained in Grade 75, which exhibited a basis weight of approximately 75 grams per square meter (g/m$^2$) and a solidity of approximately 7.9%. The webs were obtained as flat-web samples.

The flat-web samples were mechanically worked using first and second intermeshing rolls each comprising a steel working face. The first roll comprised flat-topped, male forming elements that protruded radially outward; the second roll comprised female forming elements in the form of radially-inward recesses. The recesses were slightly oversized relative to the male forming elements to accept the male forming elements thereinto. Specifically, the male forming elements were flat-topped posts that were square in overall shape, approximately 3.8×3.8 mm in cross-sectional dimension, with smoothly rounded corners. The posts were approximately 3.7 mm in height (above the flat "land" area of the surface of the first roll), with the edges of the post-tops being slightly rounded. The female forming elements were flat-bottomed square recesses, approximately 5.3×5.3 mm in cross-sectional dimension, with smoothly rounded corners. The recesses were approximately 3.8 mm deep (below the flat "land" area of the surface of the second roll). The outermost edges of the female forming elements were slightly rounded. The posts of the first roll, and the recesses of the second roll, were arranged in square arrays at a center-to-center spacing of approximately 8 mm, arranged at an angle of approximately 45 degrees relative to the lateral axis of each roll. The first and second rolls were registered with each other and were operated so that as the rolls counter rotated and the radially-outwardmost surfaces of the male forming elements extended into the recesses to provide an intermeshing distance of close to 3.7 mm (in other words, the rolls were operated in a condition that was close to fully-engaged).

Web samples as described above were relofted by being passed through a nip between the first and second intermeshing rolls at room temperature and at line speeds that varied between approximately 2 centimeters to 30 centimeters per second. The thus-produced relofted nonwoven web exhibited protruding areas arranged in a generally square array with a nearest-neighbor center-to-center spacing of approximately 8 mm. The protruding areas typically protruded a distance of less than 1-2 mm outward from the major plane of the web. The relofted spunbonded web had an average basis weight of 75 g/m$^2$, an average thickness of 1.3 mm, and a solidity of approximately 6.0%.

Deposition of Continuous-Contact Filaments

Polypropylene filaments (PP M3766 resin from TOTAL Petrochemicals, TX, USA) were then extrusion bonded onto one side of the relofted spunbonded web using conventional extrusion equipment. A die was used that comprised roughly 112 orifices, at a spacing of approximately 3.1 mm, so as to provide 112 molten streams covering a span of approximately 14 inches (356 mm). The molten polypropylene streams were extruded onto the face of a smooth-faced steel backing roll, which was controlled to the room temperature, or approximately 23 degrees Celsius. The backing roll was nipped against the above-mentioned second intermeshing roll (at a pressure of 150 pli), so that the three rolls collectively formed a three-roll stack that allowed the deposition of the continuous-contact filaments to be performed in-line with the relofting process. As the backing roll and the second intermeshing roll counter-rotated, the relofted spunbonded web was carried into the nip between the second intermeshing roll and the smooth-faced backing roll after a short wrap on the second intermeshing roll. The molten polypropylene streams were carried into this nip while resting on the surface of the backing roll, partially solidifying during their journey. As the partially solidified filaments and the relofted spunbonded web approached the nip, the partially solidified filaments came into contact with the front face of the web. After passing through the nip, the relofted spunbonded web bearing the partially solidified filaments continued in contact with the smooth-faced backing roll around a wrap angle of approximately 120 degrees. At this point the filaments were substantially solidified (and were well bonded to the web) to provide a relofted spunbonded web having polypropylene filaments continuously attached to one side of the web (aligned in the machine direction). The continuous-contact filaments were generally parallel to each other and generally evenly spaced. The continuous-contact filaments had an average diameter estimated to be in the range of 0.5 mm, and average spacing between filaments of approximately 3 mm. The fact that the web had been relofted did not significantly interfere with the ability to extrusion-bond the filaments thereto.

Pleating

The relofted spunbonded web having continuous-contact filaments thereon was then transported to a blade-pleating apparatus (CNC Controlled Pleating Machine, JCEM GmbH, Switzerland) and was pleated by operating the blade-pleating apparatus in a conventional manner. The pleat height was set at approximately 19 mm, and the pleat spacing was set at approximately 17 mm (Working Example W-1) or 12.5 mm (Working Example W-2). The presence of the continuous-contact filaments did not interfere with the ability of the web to be pleated.

Deposition of Bridging Filaments

The pleated web was then transported to an extrusion apparatus while resting on a belt conveyor that comprised a spacing plate with fixtures that momentarily held the pleats in the above-described configuration. With the pleated web supported in this manner, conventional extrusion equipment was used to deposit polypropylene filaments (PP M3766 resin from TOTAL Petrochemicals, TX, USA) onto the pleat-tips of the pleated web. These filaments were deposited onto the opposite side of the pleated media from the side comprising the above-described continuous-contact filaments.

The extrusion-bonding of the filaments to the pleat tips was performed by extruding the filaments onto a roll-supported belt that was moving in the same direction as the conveyor belt carrying the pleated web. The filaments were carried into contact with the pleat tips while resting on the surface of the roll-supported belt, partially solidifying during their journey. The belt tension and the gap between the roll-supported belt and the pleat tips of the web was controlled to ensure that the filaments contacted only the pleat tips of the web. The filaments solidified to form linear bridging filaments that were in contact with (and bonded to) the pleat tips but were not in contact with the majority of the pleat walls, that were oriented orthogonally to the pleat direction of the web, were generally parallel to each other, and that were generally evenly spaced. The extrusion die that was used comprised roughly 27 orifices, at a spacing of approximately 12.5 mm. The thus-produced linear bridging filaments had an average diameter estimated to be in the range of 1 mm and exhibited an average spacing of approximately 12.5 mm. The resulting pleated fibrous web provided a pleated air filter media generally similar to that shown in FIGS. 1, 2 and 4, having continuous-contact filaments on one side of the web (the downstream face) and linear bridging filaments on the opposite side of the web (the upstream face).

Performance Evaluations

The air filtration performance of Working Example pleated filter media samples W-1 and W-2 was evaluated using the Capture Efficiency, Pressure Drop, and Dust Holding Capacity tests methods described above. The test samples were approximately 508 mm long by 356 mm wide and were each fitted with a perimeter support frame (a box frame, installed by conventional methods) in order to perform the testing. Filtration performance is summarized in Table 2. A Comparative Example sample was also evaluated. This sample was a Grade 75 spunbonded web that had not been relofted, and that did not comprise either continuous-contact filaments or linear bridging filaments. Rather, this web was pleated (at a pleat height and pleat spacing similar to that of Working Example W-1) with the pleats being stabilized by a metal wire mesh that was laminated to the media.

TABLE 1

Filtration Performance

| Sample | Solidity (%) | Pleat Spacing (mm) | Capture Efficiency - E1 efficiency (%) | Pressure Drop (mm H$_2$O) | Dust Holding Capacity (g) |
|---|---|---|---|---|---|
| Comparative | 7.9 | 17 | 77 | 0.30 | 5.8 |
| W-1 | 6.0 | 17 | 77 | 0.28 | 9.9 |
| W-2 | 6.0 | 12.5 | 78 | 0.25 | 13.8 |

The Working Example samples exhibited enhanced Dust Holding Capacity performance relative to the Grade 75 control sample, while maintaining comparable Pressure Drop and Capture Efficiency performance.

COMPRESSIBILITY EVALUATIONS

To examine lateral compressibility, the Working Example samples were manually compressed along the pleat direction using moderate force. (FIG. 5 shows an example of a Working Example sample media having been manually compressed into a laterally compressed condition.) Working Example W-1 exhibited a lateral compression ratio of approximately 6, and Working Example W-2 exhibited a lateral compression ratio of approximately 4.8.

To examine the compressibility along the folding direction, the filter media were attempted to be manually compressed along this direction using moderate force. It was found that the filter media was substantially incompressible along this direction. That is, the linear bridging filaments remained relatively straight (when viewed along the pleat direction) rather than deforming into (or bulging out of) the pleat valleys. This, in combination with the truss-like effect achieved by the combination of the linear bridging filaments and the continuous-contact filaments, imparted the pleated media with significant ability to resist being compressed (e.g., being "accordionized") along the folding direction.

The pleated air filter media thus exhibited the unique property of being substantially incompressible along the folding direction of the pleated air filter media while being laterally compressible along the pleat direction of the pleated air filter media. The truss-like arrangements also provided that the pleated structure was stable without the necessity of using e.g. a wire mesh to stabilize the pleated structure.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document incorporated by reference herein, this specification as written will control.

What is claimed is:

1. A pleated air filter media comprising an upstream face and a downstream face and a plurality of oppositely-facing pleats with a pleat direction and with a plurality of upstream pleat tips and upstream pleat valleys and downstream pleat tips and downstream pleat valleys,
    wherein the pleated air filter media comprises a plurality of upstream linear bridging filaments that are extrusion-bonded to at least some of the upstream pleat tips of the pleated air filter media, and,
    wherein the pleated air filter media comprises a plurality of downstream continuous-contact filaments that are extrusion-bonded to the downstream face of the pleated air filter media.

2. The pleated air filter media of claim 1 wherein a ratio of an average diameter of the upstream linear bridging filaments to an average diameter of the continuous-contact filaments is at least about 3.0:1.0.

3. The pleated air filter media of claim 1 wherein a ratio of an average diameter of the upstream linear bridging filaments to an average diameter of the continuous-contact filaments is at least about 5.0:1.0.

4. The pleated air filter media of claim 1 wherein all of the upstream linear bridging filaments are parallel to each other, are spaced along the pleat direction, and are oriented orthogonal to the pleat direction; and, wherein the downstream continuous-contact filaments are at least substantially parallel to each other; are spaced along the pleat direction, and are oriented at least substantially orthogonal to the pleat direction.

5. The pleated air filter media of claim 1 wherein the upstream linear bridging filaments comprise an average center-to-center spacing of at least 8.0 mm and wherein the downstream continuous-contact filaments comprise an average center-to-center spacing of at most 4.0 mm.

6. The pleated air filter media of claim 1 wherein the upstream linear bridging filaments comprise an average center-to-center spacing of at least 10.0 mm and wherein the downstream continuous-contact filaments comprise an average center-to-center spacing of at most 3.0 mm.

7. The pleated air filter media of claim 1 wherein the pleated air filter media comprises an average pleat height of at least about 20 mm.

8. The pleated air filter media of claim 1 wherein the pleated air filter media is at least generally incompressible along a folding direction of the pleated air filter media, and wherein the pleated air filter media is at least generally laterally compressible along the pleat direction of the pleated air filter media.

9. The pleated air filter media of claim 8 wherein the pleated air filter media is laterally compressible so that the pleated air filter media exhibits a lateral compression ratio of at least 1.5.

10. The pleated air filter media of claim 1 wherein the pleated air filter media comprises a nonwoven fibrous web comprising organic polymeric fibers at least some of which are of a composition that comprises electrets.

11. The pleated air filter media of claim 10 wherein the upstream linear bridging filaments and the downstream continuous-contact filaments are organic polymeric materials of the same composition as at least some organic polymeric fibers of the nonwoven fibrous web.

12. The pleated air filter media of claim 1 wherein the pleated air filter media comprises a nonwoven fibrous web that is a spun-bonded nonwoven web.

13. The pleated air filter media of claim 12 wherein the pleated air filter media consists essentially of a spun-bonded nonwoven web that comprises organic polymeric fibers of a composition that comprises electrets.

14. The pleated air filter media of claim 12 wherein the spun-bonded nonwoven web is a high-loft web that exhibits a solidity of less than 8.0.

15. The pleated air filter media of claim 1 wherein the pleated air filter media further comprises a plurality of downstream linear bridging filaments that are at least substantially parallel to each other, are spaced along the pleat direction, are oriented at least substantially orthogonal to the pleat direction, and are extrusion-bonded to at least some of the downstream pleat tips of the pleated air filter media.

16. The pleated air filter media of claim 1 wherein the pleated air filter media further comprises a plurality of upstream continuous-contact filaments that are at least substantially parallel to each other, are spaced along the pleat direction, are oriented at least substantially orthogonal to the pleat direction, and are extrusion-bonded to the upstream face of the pleated air filter media.

17. An air filter comprising the pleated air-filter media of claim 1.

18. The air filter of claim 17 wherein a perimeter support frame is mounted to four major edges of the pleated air-filter media so that the air filter is a framed air filter.

19. A method of filtering air, the method comprising:
    positioning the air filter of claim 17 in an air-handling system; and, operating the air-handling system so that moving air is motivated through the pleated air-filter media so as to filter the air motivated therethrough.

20. A method of making a pleated air filter media comprising upstream linear bridging filaments and downstream continuous-contact filaments, the method comprising:

extruding a first plurality of molten streams of organic polymeric material and partially solidifying the molten streams into a plurality of first parallel, spaced-apart, elongate, partially-solidified filaments;

bringing the first partially-solidified filaments into contact with a downstream face of a moving, flat, fibrous air-filtration web so that the first partially-solidified filaments are in continuous contact with the downstream face of the fibrous air-filtration web;

allowing the first partially-solidified filaments to solidify into downstream continuous-contact filaments that are bonded to the downstream face of the fibrous air-filtration web;

then, folding the fibrous air-filtration web into a pleated configuration;

extruding a second plurality of molten streams of organic polymeric material and partially solidifying the molten streams into a plurality of second parallel, spaced-apart, elongate, partially-solidified filaments;

bringing the second partially-solidified filaments into contact with upstream pleat tips of the pleated fibrous air-filtration web so that the second partially-solidified filaments are in discontinuous contact with the upstream face of the fibrous air-filtration web;

and, allowing the second partially-solidified filaments to solidify into upstream linear bridging filaments that are bonded to the upstream pleat tips of the fibrous air-filtration web.

* * * * *